United States Patent
Hanamoto

(10) Patent No.: US 10,970,915 B2
(45) Date of Patent: Apr. 6, 2021

(54) VIRTUAL VIEWPOINT SETTING APPARATUS THAT SETS A VIRTUAL VIEWPOINT ACCORDING TO A DETERMINED COMMON IMAGE CAPTURING AREA OF A PLURALITY OF IMAGE CAPTURING APPARATUSES, AND RELATED SETTING METHOD AND STORAGE MEDIUM

(71) Applicant: CANON KABUSHIKI KAISHA, Tokyo (JP)

(72) Inventor: Takashi Hanamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 15/860,768

(22) Filed: Jan. 3, 2018

(65) Prior Publication Data
US 2018/0197324 A1 Jul. 12, 2018

(30) Foreign Application Priority Data

Jan. 6, 2017 (JP) .............................. JP2017-001042
Dec. 22, 2017 (JP) .............................. JP2017-246040

(51) Int. Cl.
*G06T 15/00* (2011.01)
*G06T 15/20* (2011.01)
(Continued)

(52) U.S. Cl.
CPC .......... *G06T 15/20* (2013.01); *G06F 3/04815* (2013.01); *G06T 7/55* (2017.01);
(Continued)

(58) Field of Classification Search
None
See application file for complete search history.

(56) References Cited

U.S. PATENT DOCUMENTS 6,522,325 B1 * 2/2003 Sorokin ................. G03B 37/04
345/427
8,089,479 B2 * 1/2012 Deb ...................... G06T 19/003
345/419
(Continued)

FOREIGN PATENT DOCUMENTS

JP 2011-172169 A 9/2011

*Primary Examiner* — Anh-Tuan V Nguyen
(74) *Attorney, Agent, or Firm* — Venable LLP

(57) ABSTRACT

A setting apparatus sets a virtual viewpoint corresponding to a virtual viewpoint image that is generated based on images obtained by image capturing from a plurality of directions. The setting apparatus includes one or more hardware processors, and one or more memories that store instructions executable by the one or more hardware processors to cause the setting apparatus to determine a common image capturing area that is included within each of a plurality of fields of view, of a plurality of image capturing apparatuses used for obtaining at least a part of the plurality of captured images, and to cause a graphical user interface (GUI), used for setting the virtual viewpoint, to identifiably display the determined common image capturing area. In addition, the setting apparatus sets of the virtual viewpoint according to a user input based on the GUI identifiably displaying the determined common image capturing area.

20 Claims, 13 Drawing Sheets

(51) Int. Cl.
*G06T 7/70* (2017.01)
*G06T 19/00* (2011.01)
*G06F 3/0481* (2013.01)
*G06T 7/55* (2017.01)
*G06T 7/593* (2017.01)

(52) U.S. Cl.
CPC ............... *G06T 7/593* (2017.01); *G06T 7/70* (2017.01); *G06T 15/205* (2013.01); *G06T 19/00* (2013.01); *G06T 2200/24* (2013.01); *G06T 2207/10016* (2013.01); *G06T 2207/30196* (2013.01); *G06T 2207/30221* (2013.01); *G06T 2207/30228* (2013.01); *G06T 2207/30244* (2013.01); *G06T 2215/16* (2013.01)

(56) References Cited

U.S. PATENT DOCUMENTS

| | | | | |
|---|---|---|---|---|
| 8,576,235 B1* | 11/2013 | Sumner | ................... | G06T 13/20 345/473 |
| 9,007,379 B1* | 4/2015 | Shafer | ..................... | G06T 11/40 345/473 |
| 2002/0075264 A1* | 6/2002 | Iizuka | ..................... | A63F 13/10 345/427 |
| 2003/0076413 A1* | 4/2003 | Kanade | ................... | G06T 15/20 348/139 |
| 2006/0181610 A1* | 8/2006 | Carlsson | ............ | H04N 5/23238 348/159 |
| 2008/0259162 A1* | 10/2008 | Aoki | ...................... | H04N 5/232 348/159 |
| 2009/0102841 A1* | 4/2009 | Clavadetscher | ........ | G06T 15/20 345/420 |
| 2009/0122195 A1* | 5/2009 | van Baar | .................. | G06T 3/40 348/584 |
| 2009/0244064 A1* | 10/2009 | Inokuchi | ................ | A63F 13/10 345/420 |
| 2010/0026788 A1* | 2/2010 | Ishikawa | ................. | G06T 15/20 348/48 |
| 2010/0085351 A1* | 4/2010 | Deb | ........................ | G06T 15/00 345/419 |
| 2011/0149038 A1* | 6/2011 | Umeyama | ............. | H04N 13/279 348/44 |
| 2012/0147191 A1* | 6/2012 | Snoussi | ............ | G08B 13/19608 348/159 |
| 2012/0169842 A1* | 7/2012 | Chuang | ............ | G08B 13/19619 348/39 |
| 2013/0050516 A1* | 2/2013 | Hojo | .................. | H04N 5/23254 348/208.6 |
| 2013/0147961 A1* | 6/2013 | Gao | ........................ | H04N 7/181 348/159 |
| 2013/0300742 A1* | 11/2013 | Ikeda | ........................ | G06T 5/00 345/428 |
| 2014/0078263 A1* | 3/2014 | Kim | ........................ | G06T 7/285 348/47 |
| 2014/0168432 A1* | 6/2014 | Nystrom | ............ | H04N 5/23212 348/143 |
| 2014/0300645 A1* | 10/2014 | Gillard | ...................... | G06T 3/40 345/660 |
| 2014/0327757 A1* | 11/2014 | Shen | .................... | G02B 21/368 348/79 |
| 2014/0347450 A1* | 11/2014 | Han | ....................... | G06T 3/0031 348/48 |
| 2015/0031450 A1* | 1/2015 | Matsuura | ................ | A63F 13/00 463/31 |
| 2015/0055099 A1* | 2/2015 | Kim | ....................... | G03B 37/04 353/30 |
| 2015/0241980 A1* | 8/2015 | Jeon | ....................... | G06F 3/0488 345/156 |
| 2015/0294511 A1* | 10/2015 | Nishioka | ............ | H04N 5/23212 345/420 |
| 2015/0371438 A1* | 12/2015 | Sachter-Zeltzer | ....... | G06T 17/00 345/427 |
| 2016/0105655 A1* | 4/2016 | Yoshimura | ............. | G03B 21/26 348/761 |
| 2016/0210516 A1* | 7/2016 | Kim | .................... | G06K 9/00751 |
| 2016/0220905 A1* | 8/2016 | Harada | .................... | A63F 13/56 |
| 2016/0328833 A1* | 11/2016 | Kiyota | .................... | E02F 9/261 |
| 2017/0019629 A1* | 1/2017 | Fukasawa | ............. | H04L 51/043 |
| 2017/0085764 A1* | 3/2017 | Kim | .................... | H04N 5/2258 |
| 2017/0289505 A1* | 10/2017 | Johnson | ................. | H04N 7/181 |
| 2018/0031845 A1* | 2/2018 | Yoshioka | ............... | G03B 25/02 |
| 2018/0070045 A1* | 3/2018 | Holmes | ................. | H04N 7/141 |
| 2018/0103209 A1* | 4/2018 | Fischler | .................... | G06T 7/55 |
| 2018/0150939 A1* | 5/2018 | Chan | .................... | G06K 9/6228 |

* cited by examiner

FIG.2A
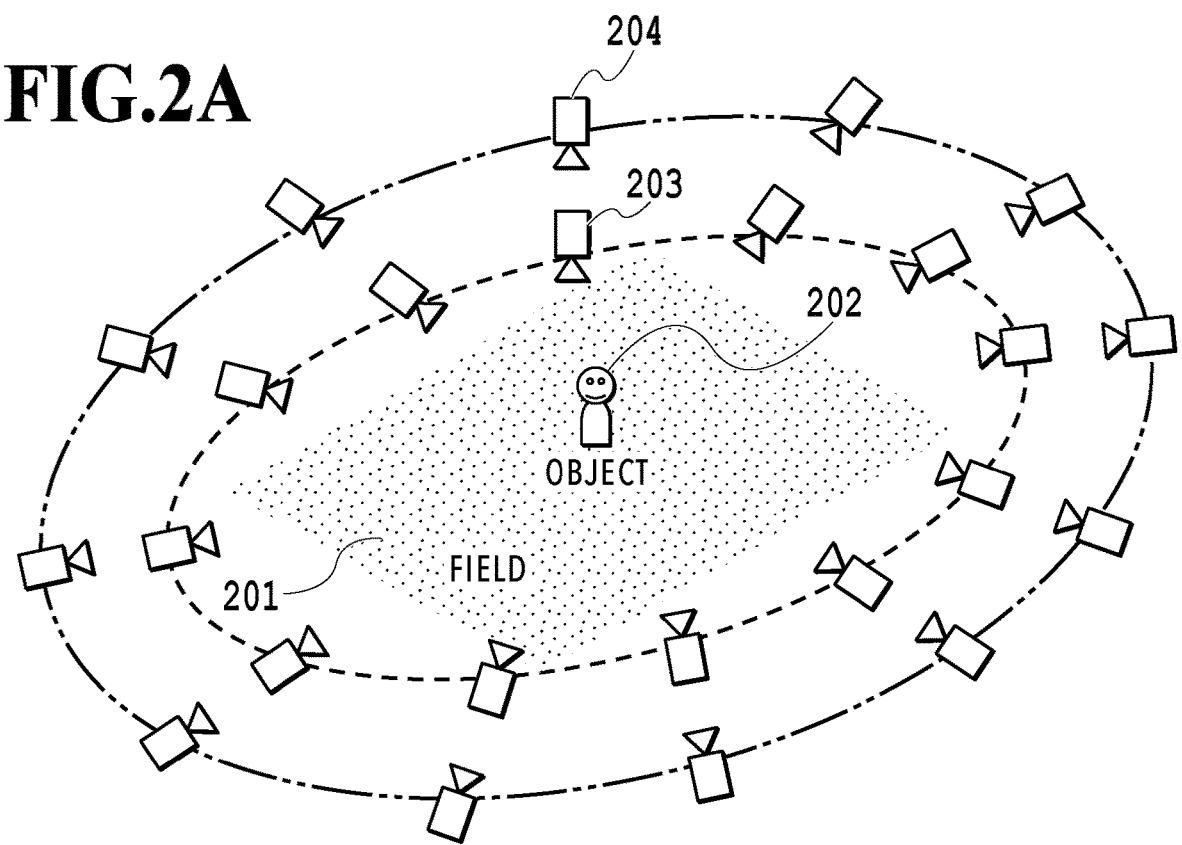
FIG.2B
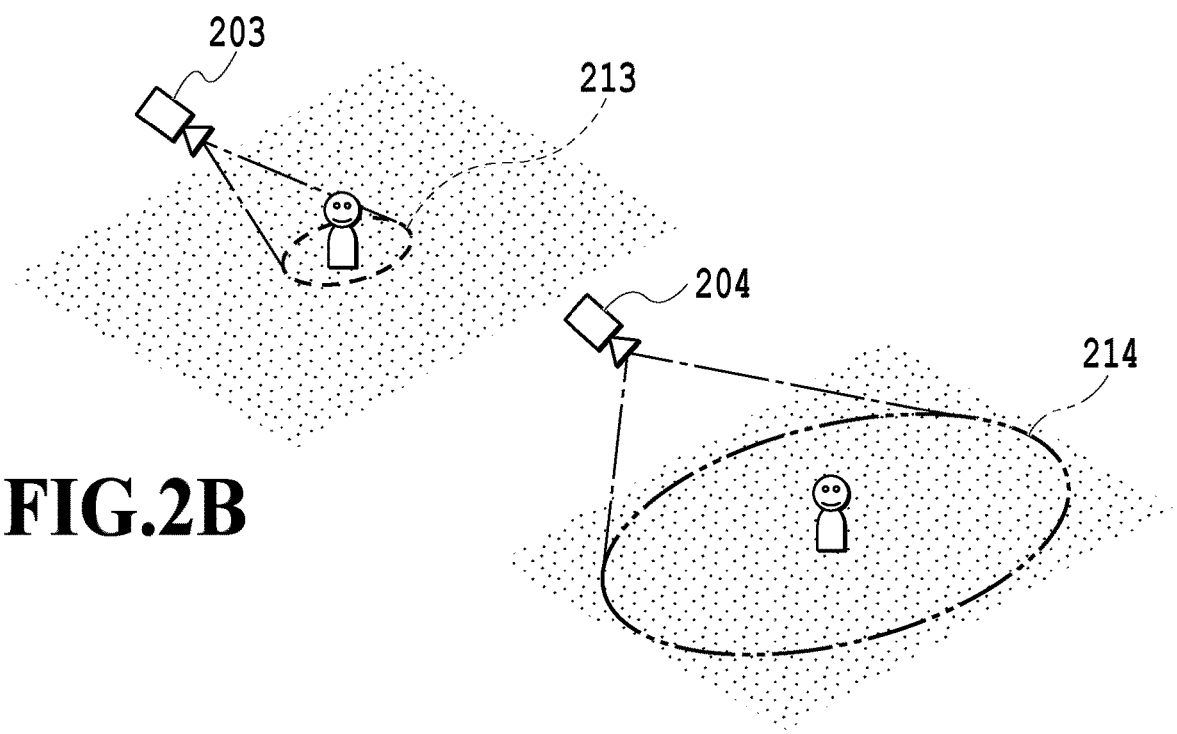
FIG.2C

VIRTUAL VIEWPOINT SETTING APPARATUS THAT SETS A VIRTUAL VIEWPOINT ACCORDING TO A DETERMINED COMMON IMAGE CAPTURING AREA OF A PLURALITY OF IMAGE CAPTURING APPARATUSES, AND RELATED SETTING METHOD AND STORAGE MEDIUM

This application claims the benefit of Japanese Patent Application No. 2017-001042, filed on Jan. 6, 2017, and Japanese Patent Application No. 2017-246040, filed on Dec. 22, 2017, which are hereby incorporated by reference herein in their entireties.

BACKGROUND OF THE INVENTION

Field of the Invention

The present invention relates to a technique of setting a parameter relating to a virtual viewpoint.

Description of the Related Art

As a technique to reproduce a video image from a camera (virtual camera) that does not actually exist, which is arranged virtually in a three-dimensional space, by using video images captured by a plurality of real cameras, there is a virtual viewpoint video image technique. In generation of a virtual viewpoint video image, there exists an area in which a video image from the virtual camera cannot be reproduced due to a blind area between video images captured by the real cameras. Further, in a case in which the virtual camera moves closer, than the real cameras, to a person, or the like, (object) within an image capturing scene, a degree of resolution of the object decreases, thereby causing the video image to be blurred. If a path of the virtual camera (positional movement of the virtual camera along a time axis) is set without considering the above matters, a virtual viewpoint video image to be obtained will be of a poor image quality. Accordingly, there may be a possibility that the resultant virtual viewpoint video image must be checked by using a preview screen, or the like, and the path of the virtual camera must be set repeatedly for several times (resetting).

Regarding this point, a technique of presenting, to a user, information of a blind area between video images captured by real cameras has been proposed in Japanese Patent Laid-Open No. 2011-172169. In this technique, by visualizing a blind angle area and an area that is not intended to be viewed by an observer on a two-dimensional map, the blind angle area can be checked in advance without actually generating virtual viewpoint video images.

In the above method disclosed in Japanese Patent Laid-Open No. 2011-172169, however, the correspondence relationship between the position of the virtual viewpoint and the quality of virtual viewpoint video images has not been able to be confirmed before the setting of the virtual viewpoint.

SUMMARY OF THE INVENTION

A setting apparatus of the present invention is a setting apparatus for setting a virtual viewpoint relating to a virtual viewpoint video image that is generated using multi-viewpoint video images, and the setting apparatus includes a determining unit configured to determine a plurality of common image capturing areas including at least a first common image capturing area, in which image capturing areas of a plurality of first cameras belonging to a first camera group overlap one another, and a second common image capturing area, in which image capturing areas of a plurality of second cameras belonging to a second camera group overlap one another, and a setting unit configured to set a parameter relating to the virtual viewpoint based on a user input via a graphical user interface (GUI), wherein the GUI displays the plurality of common image capturing areas so as to allow a user recognize them, respectively, the plurality of common image capturing areas including at least the first common image capturing area and the second common image capturing area determined by the determining unit.

Further features of the present invention will become apparent from the following description of exemplary embodiments with reference to the attached drawings.

BRIEF DESCRIPTION OF THE DRAWINGS

FIG. 2A is a diagram showing one example of a camera arrangement, and FIGS. 2B and 2C are diagrams each showing an image capturing area of a camera belonging to a camera group.

DESCRIPTION OF THE EMBODIMENTS

Hereafter, with reference to the attached drawings, the present invention is explained in detail in accordance with preferred embodiments. Configurations shown in the following embodiments are merely exemplary, and the present invention is not limited to the configurations shown schematically.

First Embodiment

Figure 1:
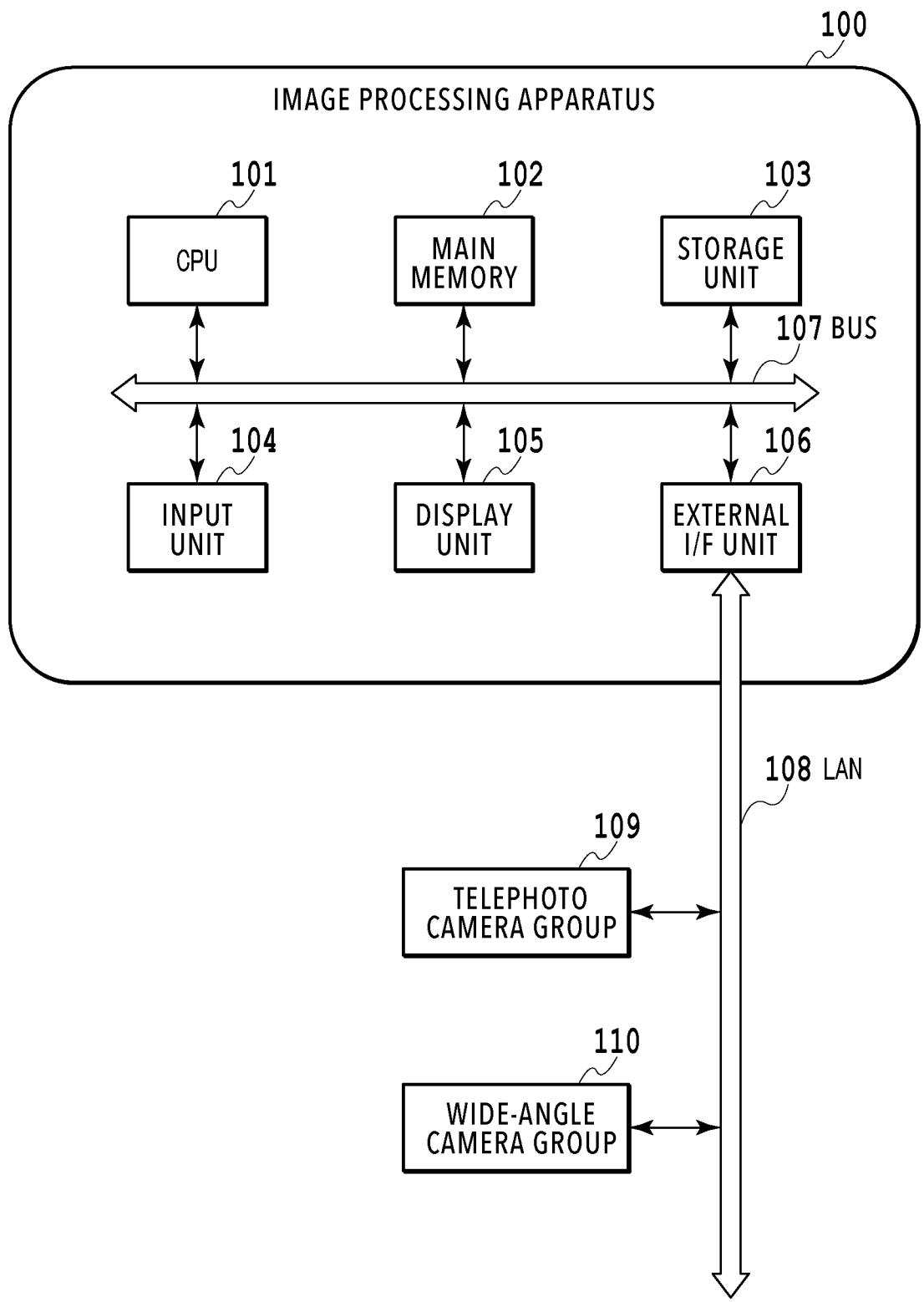
FIG. 1 is a diagram showing one example of a configuration of a virtual viewpoint video image system.

FIG. 1 is a diagram showing one example of a configuration of a virtual viewpoint video image system according to the present embodiment. The virtual viewpoint video image system shown in FIG. 1 includes an image processing apparatus 100 and two kinds of camera groups, 109 and 110. Further, the image processing apparatus 100 includes a central processing unit (CPU) 101, a main memory 102, a storage unit 103, an input unit 104, a display unit 105, and an external interface (I/F) unit 106, and each unit is connected via a bus 107. The CPU 101 is a central processing unit configured to centrally control the image processing apparatus 100 and performs various kinds of processing by executing various programs stored in the storage unit 103, and the like. The main memory 102 temporarily stores data, parameters, and so on, that are used in the various kinds of processing, and, at the same time, provides a work area to the CPU 101. The storage unit 103 is a large-capacity storage device that stores various programs and various pieces of data necessary for a graphical user interface (GUI) display, and further, a nonvolatile memory, such as a hard disk and a silicon disk, is used for the storage unit 103. The input unit 104 is a device, such as a keyboard, a mouse, an electronic pen, and a touch panel, that receives various inputs from a user. The display unit 105 is composed of a liquid crystal panel, and the like, and produces a GUI display for the path setting of a virtual camera at the time of generating a virtual viewpoint video image. The external I/F unit 106 is connected with each camera included in the camera groups 109 and 110 via a network (here, a local area network (LAN) 108) and performs transmission and reception of video image data and control signal data. The bus 107 connects each of the units described above and transfers data.

The above-described two kinds of camera groups are a telephoto (narrow-angle) camera group 109 and a wide-angle camera group 110. The telephoto camera group 109 includes a plurality of cameras each mounting a lens whose angle of view is narrow (for example, 10 degrees). The wide-angle camera group 110 includes a plurality of cameras each mounting a lens whose angle of view is wide (for example, 45 degrees). Further, each camera included in the telephoto camera group 109 and the wide-angle camera group 110 is connected to the image processing apparatus 100 via the LAN 108. In addition, each of the telephoto camera group 109 and the wide-angle camera group 110 starts and stops image capturing, changes camera settings (shutter speed, aperture stop, and so on), and transfers captured video image data based on control signals from the image processing apparatus 100.

Incidentally, in the system configuration, various components exist other than those described above, but they are not the main purpose of the present invention, and, therefore, an explanation thereof is omitted.

FIG. 2A is a diagram showing an example of a camera arrangement in an image capturing system including the two kinds of camera groups, that is, the telephoto camera group 109 and the wide-angle camera group 110, in a sports stadium where, for example, soccer, or the like, is played. On a field 201 where a game is played, a player as an object 202 exists. Further, twelve telephoto cameras 203 included in the telephoto camera group 109 and twelve wide-angle cameras 204 included in the wide-angle camera group 110 are arranged so as to surround the field 201. An area 213 surrounded by a dotted line in FIG. 2B indicates the image capturing area of the telephoto camera 203. The telephoto camera 203 has a narrow angle of view, thereby having a characteristic that the image capturing area is small but the degree of resolution in capturing the image of the object 202 is high. On the other hand, an area 214 surrounded by a dotted line in FIG. 2C indicates the image capturing area of the wide-angle camera 204. The wide-angle camera 204 has a wide angle of view, thereby having a characteristic that the image capturing area is large but the degree of resolution in capturing the image of the object 202 is low. It should be noted that, in FIGS. 2B and 2C, shapes of the image capturing areas are depicted in ellipses for convenience sake, but, as will be described later, the actual shape of the image capturing area of each camera is a rectangle and a trapezoid in general.

Figure 3:
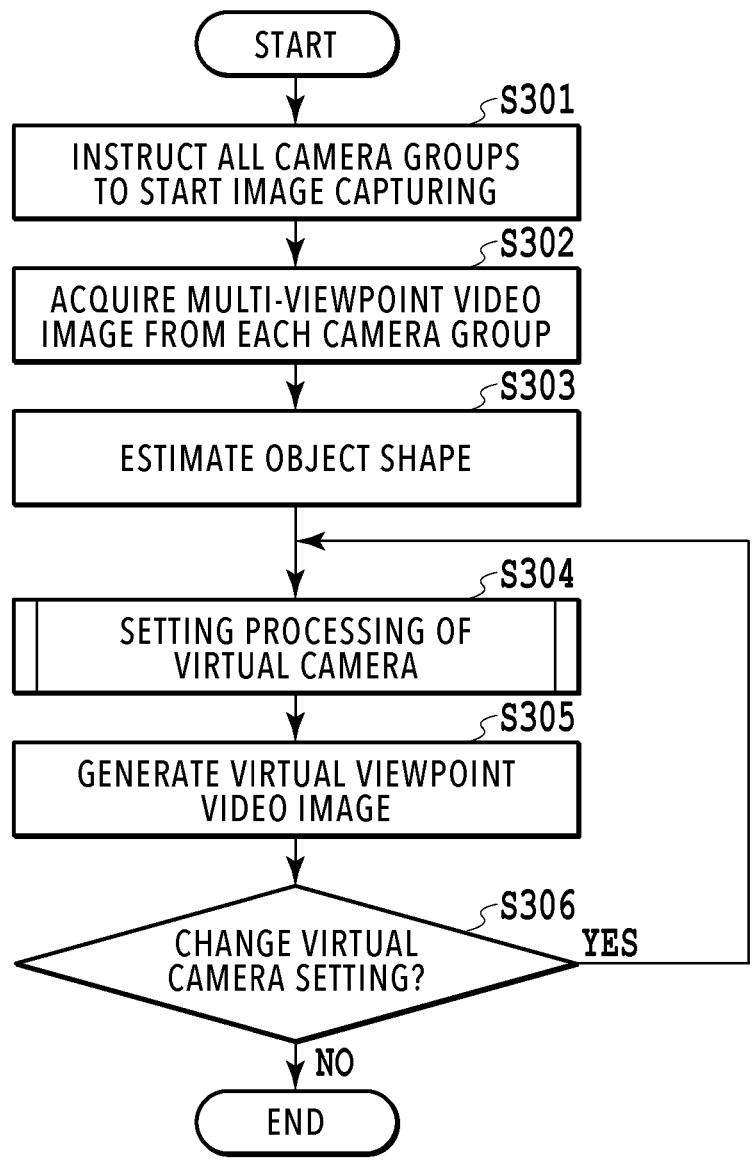
FIG. 3 is a flowchart showing an entire flow until a virtual viewpoint video image is generated.

FIG. 3 is a flowchart showing an entire flow until a virtual viewpoint video image is generated in the image processing apparatus 100. The series of processing is implemented by the CPU 101 by reading a predetermined program from the storage unit 103, loading the program onto the main memory 102, and executing the program.

In step 301, to the telephoto camera group 109 and the wide-angle camera group 110, image capturing parameters, such as the exposure condition, at the time of image capturing and an image capturing start signal are transmitted. Each camera belonging to each camera group starts image capturing in accordance with the received image capturing parameters and stores the obtained video image data in the memory within each camera.

In step 302, multi-viewpoint video image data captured by each of the telephoto cameras 203 belonging to the telephoto camera group 109 and multi-viewpoint video image data captured by each of the wide-angle cameras 204 belonging to the wide-angle camera group 110 are acquired. The acquired multi-viewpoint (here, 12 viewpoints each) video image data is loaded onto the main memory 102.

In step 303, by using the multi-viewpoint video image data acquired in step 302, estimation processing of a three-dimensional shape of an object is performed. As the estimation method, it may be possible to apply a publicly known method, such as the Visual-hull method that uses contour information of an object, and the Multi-view stereo method that uses triangulation.

In step 304, based on estimated object shape data, various parameters, such as the movement path of the virtual camera, that are required to generate virtual viewpoint video images are set. The details of processing relating to the parameter setting of the virtual camera will be described later.

In step 305, a virtual viewpoint video image is generated in accordance with the set virtual camera parameters. The virtual viewpoint video image can be generated such that a video image on an estimated object shape viewed from the set virtual camera is processed using a computer graphics technique.

In step 306, whether to generate a new virtual viewpoint video image by changing the parameter setting of the virtual camera is determined. This processing is performed based on instructions from a user who has viewed the virtual viewpoint video image displayed in a non-illustrated preview screen and has checked the image quality, and the like, thereof. In a case in which the user desires to generate a virtual viewpoint video image again, the user performs parameter setting relating to the virtual camera again (the processing returns to step 304). Then, upon changing the parameter, a virtual viewpoint video image is generated again with contents in accordance with the change. On the other hand, in a case in which the generated virtual viewpoint video image is not problematic, the present processing is terminated. The processing described above is a rough flow until the virtual viewpoint video image is generated according to the present embodiment.

Figure 4:
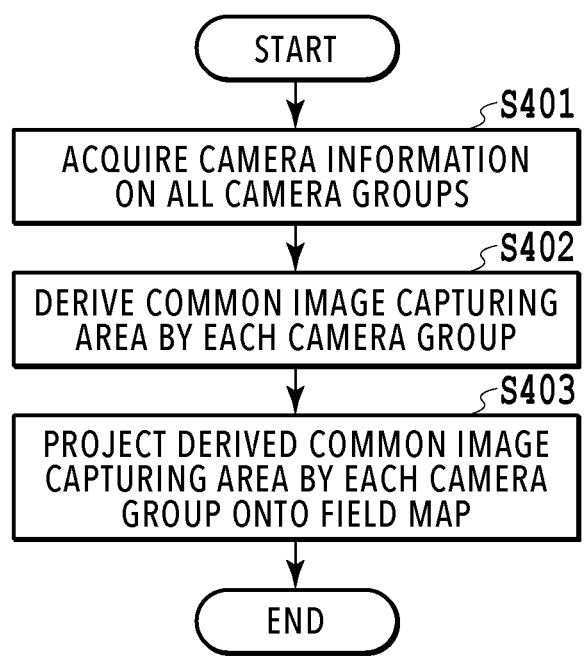
FIG. 4 is a flowchart showing a process of generating a GUI screen to be used for parameter setting of a virtual camera.

Next, processing for preparing a GUI screen to be used for parameter setting processing for the virtual camera in the above-described step 304 will be explained. FIG. 4 is a flowchart showing the process of generating the GUI screen to be used for parameter setting of the virtual camera. It should be noted that the processing of FIG. 4 may be performed prior to each processing shown in FIG. 3, or may be performed at a timing at which the processing in step 304 is performed.

In step 401, camera information on all camera groups (here, two kinds of groups, that is, the telephoto camera group 109 and the wide-angle camera group 110) is acquired. Camera information includes information such as a setting location of a camera belonging to each camera group, a gaze point position, and an angle of view. In the present embodiment, the gaze point position refers to a position of a target for image capturing by all 24 cameras. Such information may be acquired by reading the one stored in the storage unit 103 in advance, or may be acquired by accessing each camera (or one camera representing each camera group) via the LAN 108.

Figure 5:
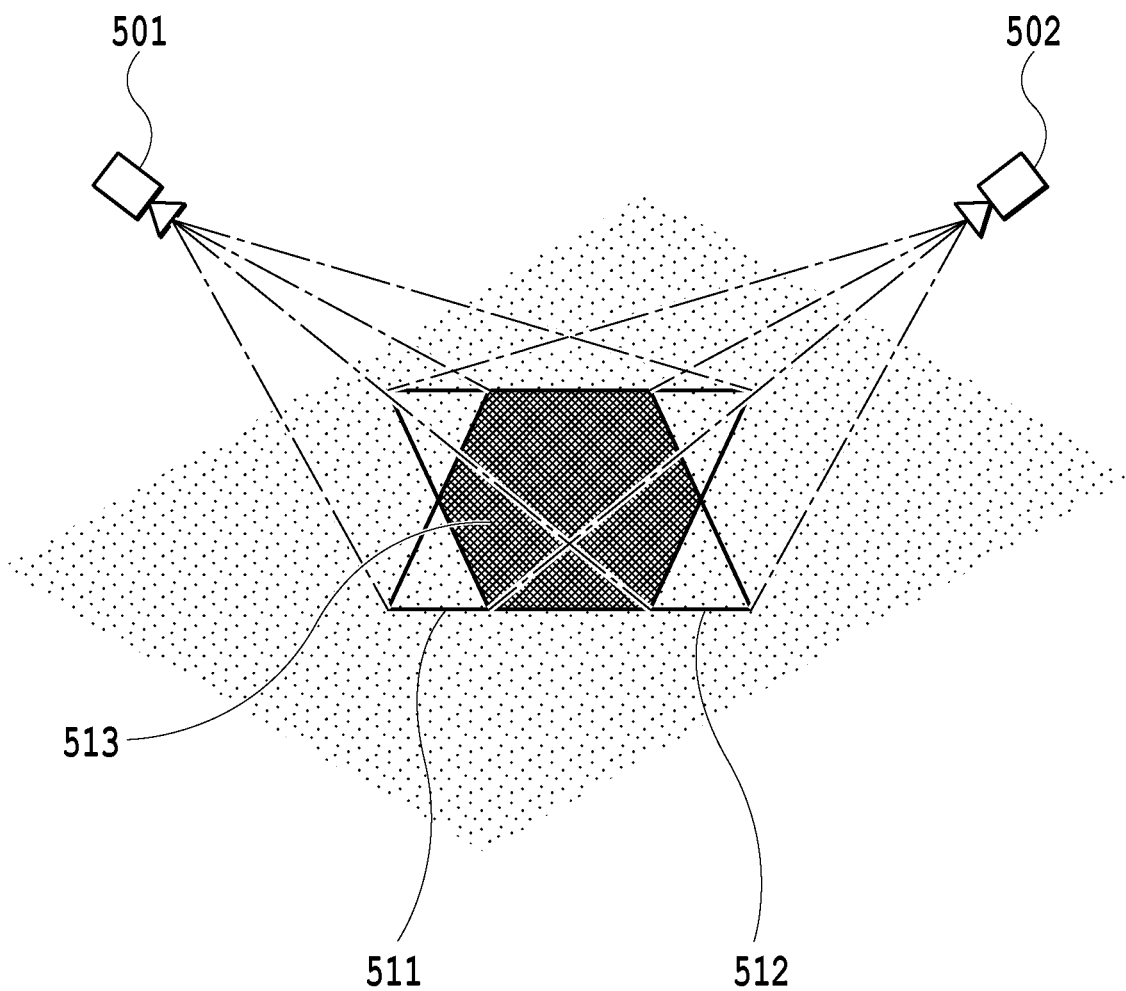
FIG. 5 is a diagram illustrating a derivation method of a common image capturing area by each camera group.

In step 402, based on the acquired camera information on each camera group, an area in which image capturing areas of a plurality of cameras having substantially the same angle of view overlap one another (common image capturing area) is derived by each camera group. The expression "substantially the same" is used herein because a slight variation in an angle of view occurs between cameras due to a difference in each distance from a camera to a gaze point. It should be noted that the angles of view of respective cameras belonging to the same camera group may not be the same. FIG. 5 is a diagram illustrating a derivation method of the common image capturing area by each camera group. In the diagram, two cameras 501 and 502 belonging to the same camera group perform image capturing directed to the same gaze point on the field 201. At this time, an image capturing area of the camera group to which the camera 501 and camera 502 belong is sought as an area 513 in which an intersection plane 511 of a quadrangular pyramid from the camera 501 toward the gaze point and the field 201 overlaps with an intersection plane 512 of a quadrangular pyramid from the camera 502 toward the gaze point and the field 201. Here, for the convenience of the explanation, two cameras 501 and 502 have been given, but the same idea also applies to three cameras or more. As such, the common image capturing area for each camera group is derived.

Figure 6:
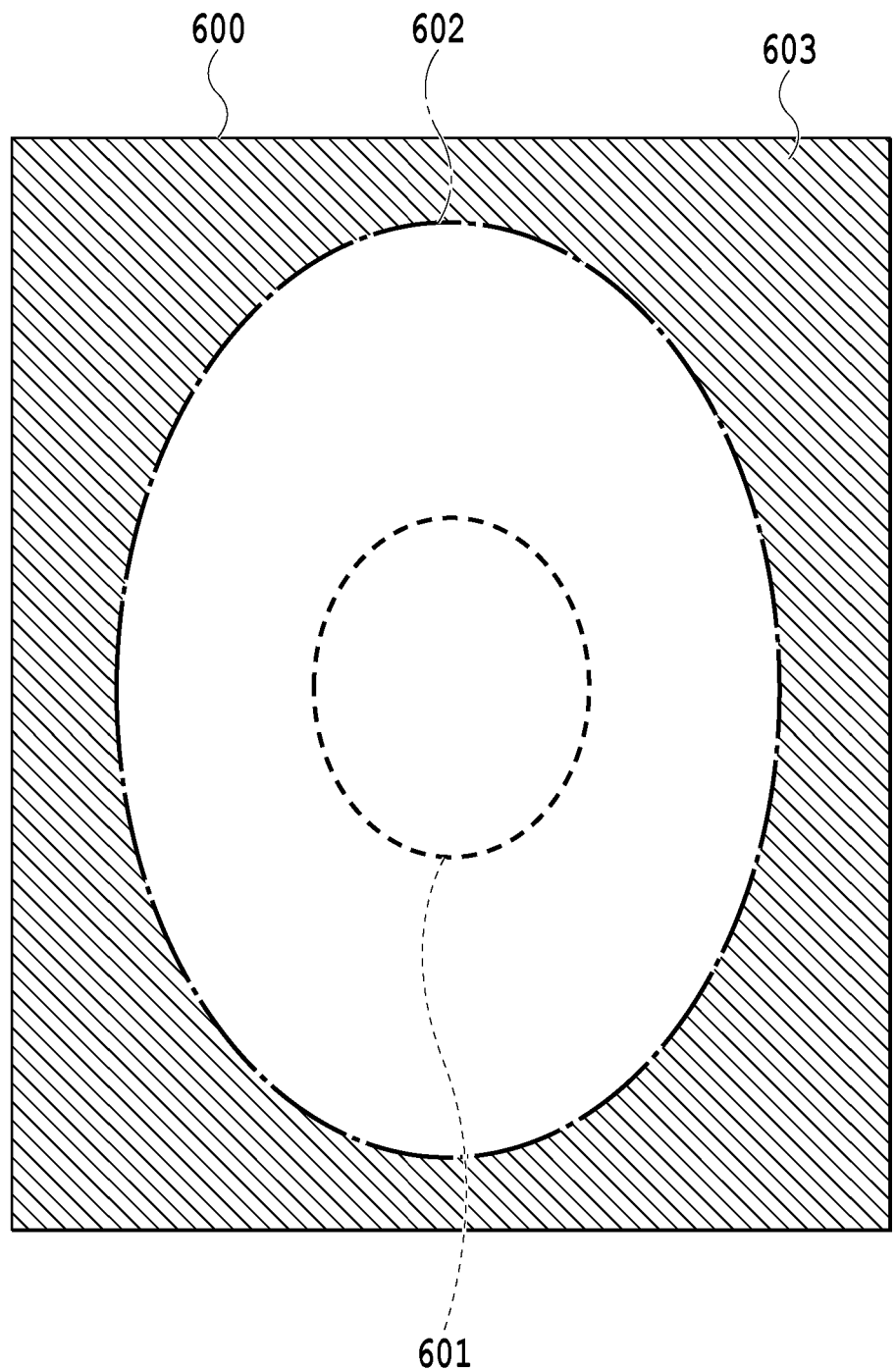
FIG. 6 is a diagram showing one example of a result in which the common image capturing area by each camera group is projected onto a field map.

In step 403, onto a bird's-eye view (field map) of the entire image capturing space including the field 201, the derived common image capturing areas of the camera groups are visualized and projected so as to discern them respectively. FIG. 6 is a diagram showing one example of a result in which the common image capturing areas of the camera groups are projected onto a field map so as to discern them respectively. In FIG. 6, a rectangular frame 600 represents the field map. In addition, an ellipse 601 drawn with a broken line represents the common image capturing area of the telephoto camera group 109 (hereafter referred to as a telephoto camera group's image capturing area). In the telephoto camera group's image capturing area 601, it is possible to generate a virtual viewpoint video image using multi-viewpoint video images captured by the telephoto camera group 109. In the telephoto camera group's image capturing area 601, the degree of resolution of an object is relatively high, and thus, it is possible to maintain the quality of the virtual viewpoint video image even if the virtual camera moves closer the object (even if the height of the virtual camera is lowered). In the case of the present embodiment, the telephoto camera group's image capturing area 601 is an area in which image capturing areas of all twelve telephoto cameras 203 belonging to the telephoto camera group 109 overlap one another. Further, an ellipse 602 drawn with a dot and dash line represents the common image capturing area of the wide-angle camera group 110 (hereafter referred to as a wide-angle camera group's image capturing area). In the wide-angle camera group's image capturing area 602, it is possible to generate a virtual viewpoint video image using multi-viewpoint video images captured by the wide-angle camera group 110. In the wide-angle camera group's image capturing area 602, the degree of resolution of an object is relatively low, and thus, the quality of the virtual viewpoint video image deteriorates if the virtual camera moves closer by a certain distance or more to the object (if the height of the virtual camera is lowered by a certain distance or more). In the case of the present embodiment, the wide-angle camera group's image capturing area 602 is an area in which image capturing areas of all twelve wide-angle cameras 204 belonging to the wide-angle camera group 110 overlap one another. Also, an area 603 drawn with oblique lines in the field map 600 represents an area in which image capturing areas of each of the wide-angle cameras 204 belonging to the wide-angle camera group 110, which has a wider angle of view in the present embodiment, do not overlap one another, and in which generation of a virtual viewpoint video image of a certain quality cannot be made (hereafter referred to as an area not allowing generation of a virtual viewpoint video image). In the example of FIG. 6, the outer edges of the telephoto camera group's image capturing area and wide-angle camera group's image capturing area are drawn with the broken line and the dot and dash line, respectively, and further, the area not allowing generation of a virtual viewpoint video image is drawn with the oblique lines, but the present invention is not limited to this. The common image capturing areas of the camera groups that can generate the virtual viewpoint video image may be displayed such that a user can discern them respectively, and each area may be indicated by color coding, for example. It should be noted that, in FIG. 6, for the convenience of the explanation, the shapes of the common image capturing areas for each of the camera groups are depicted in an ellipse, but the actual shapes are a polygon. As such, the GUI screen to be used for parameter setting processing for the virtual camera is prepared.

Figure 7:
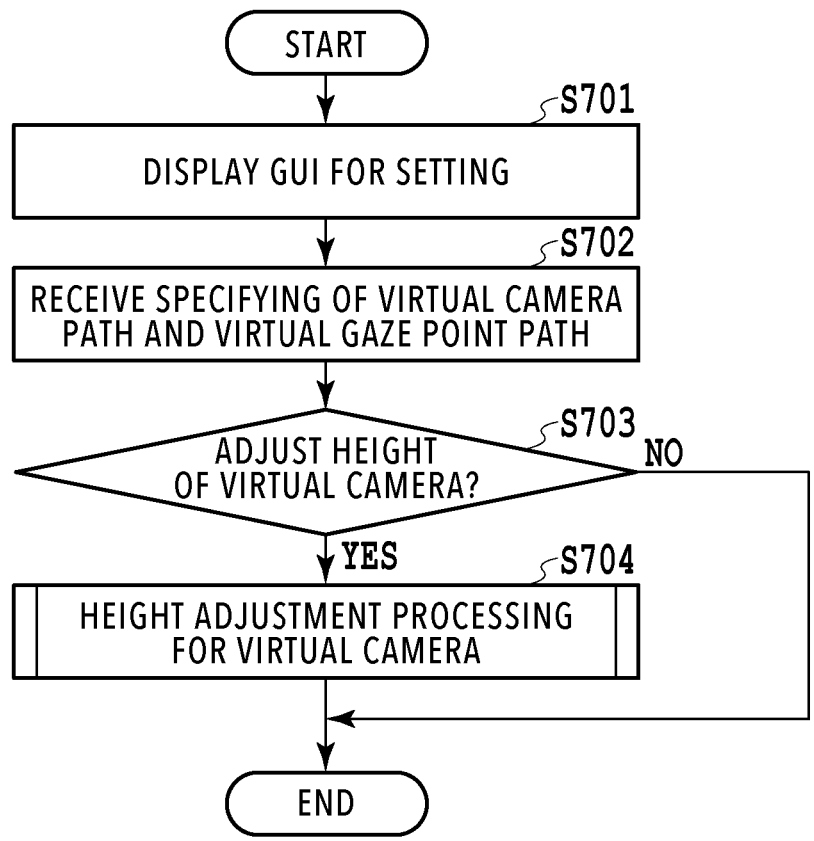
FIG. 7 is a flowchart showing a flow of parameter setting processing for the virtual camera.
Figure 8A:
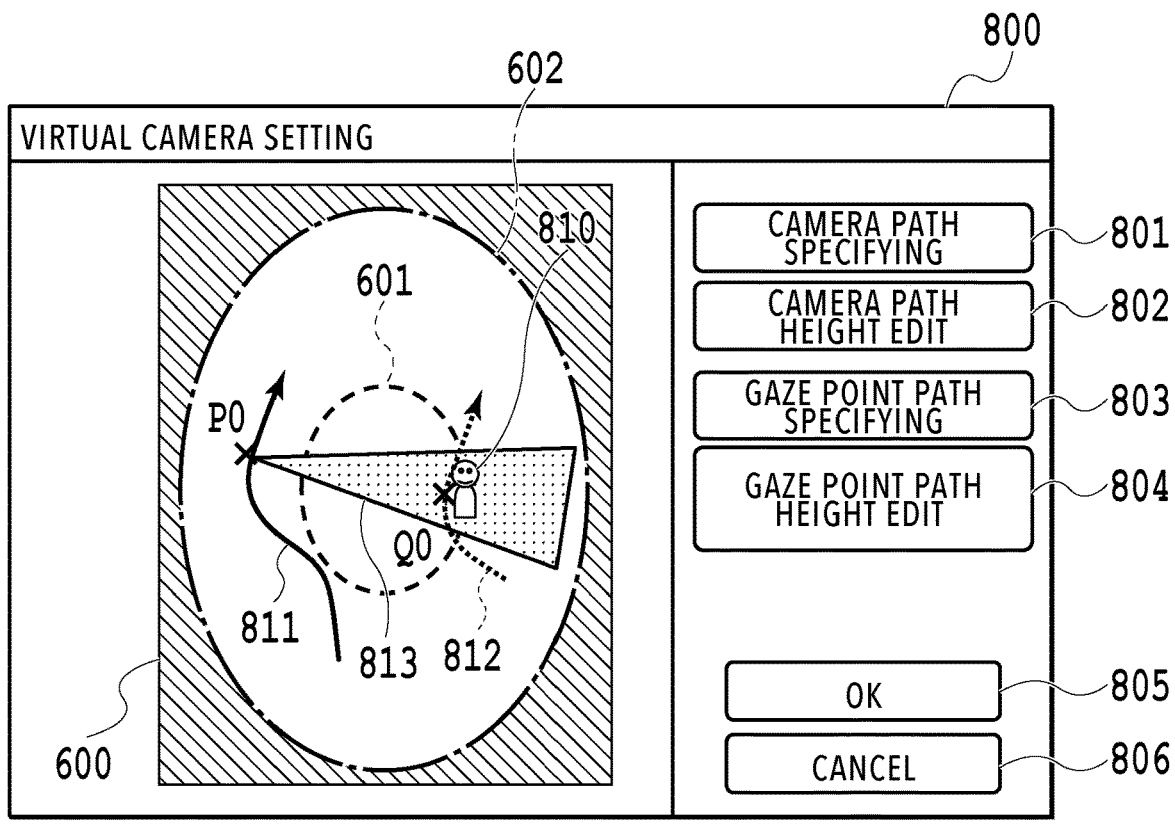
FIGS. 8A and 8B are diagrams each showing one example of a GUI screen for parameter setting of the virtual camera.
Figure 8B:
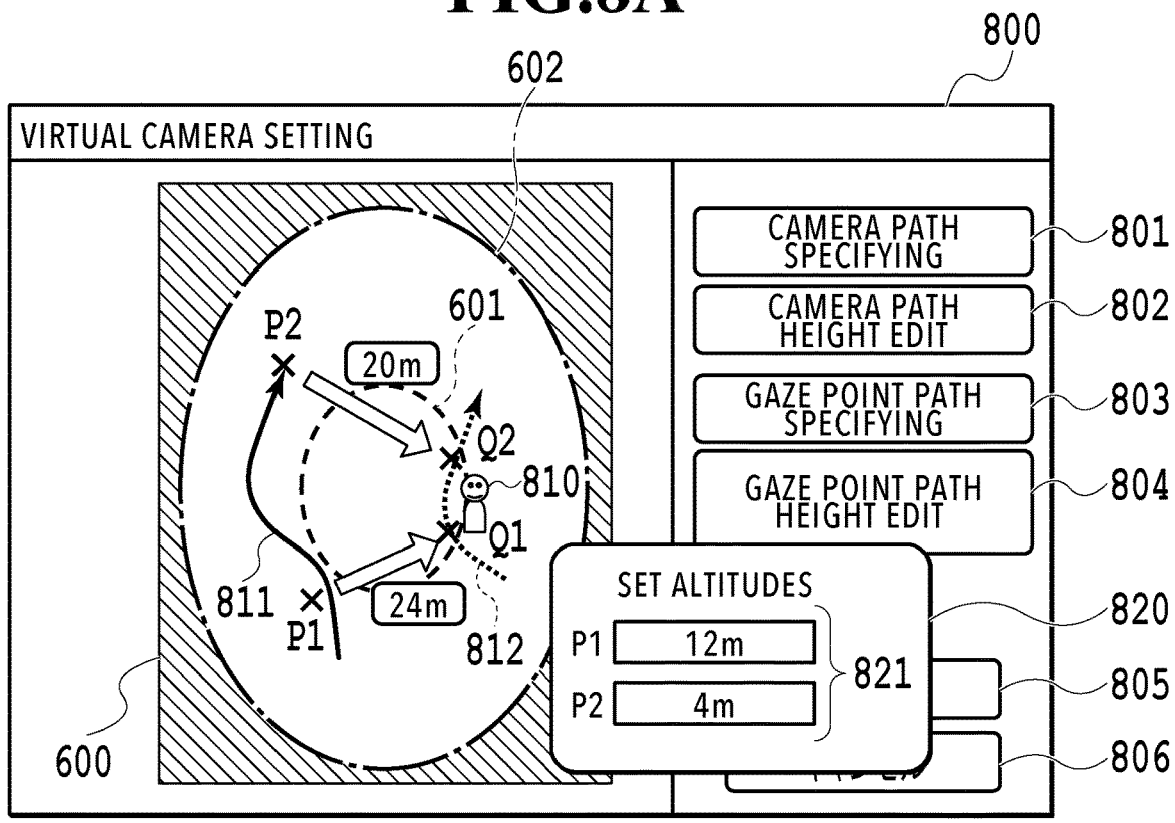

Next, with reference to the flow of FIG. 7, an explanation will be given as to the parameter setting processing for the virtual camera according to the present embodiment. The processing of FIG. 7 corresponds to the processing of step 304 in FIG. 3. First of all, in step 701, the GUI screen for parameter setting of the virtual camera is displayed on the display unit 105. FIGS. 8A and 8B are diagrams each showing one example of the GUI screen. In a GUI screen 800 shown in FIG. 8A, the field map 600 obtained by the above-described preparation processing is displayed on the left side of the screen, and an object shape 810 estimated in the above step 303 is mapped thereon.

In step 702, via the displayed GUI screen, the specifying of a movement path of the virtual camera (camera path) and a movement path of a gaze point (gaze point path) is received. The user presses a button 801 or 803 and then moves a cursor by operating a mouse, or the like, on the field map 600 to specify its movement locus as a camera path or a gaze point path. In FIG. 8A, an arrow 811 of a bold line indicates a specified camera path and an arrow 812 of a dotted line indicates a specified gaze point path. As such, the specified camera path and gaze point path correspond to each other such that they are harmonized with each other in each of set frames. In other words, in a case in which a virtual viewpoint video image is composed of 600 frames, for example, each of the paths is divided by the number of frames to obtain an equivalent number of points, and each of such divided points is caused to correspond in order from the starting point of the arrow. Once the user moves a cursor on an arbitrary position (coordinate) on the camera path 811 and performs click operation with a mouse, or the like, a divided point P0 closest to the cursor is selected and displayed, and a gaze point position Q0 corresponding to the P0 is simultaneously displayed. At this time, a view angle area 813 viewed from the virtual camera is simultaneously displayed. The user can grasp the positional relation between the gaze point Q0, the object 810, and the view angle area 813, and, therefore, the user can work on a specifying task while checking to which of the areas, among the telephoto camera group's image capturing area 601, the wide-angle camera group's image capturing area 602, and the area 603 not allowing generation of a virtual viewpoint video image, the gaze point Q0 and the object 810 belong, that is, checking the degree of resolution of the virtual viewpoint video image. Accordingly, the camera path and the gaze point path can be appropriately set and the number of repeated specifying tasks can be reduced. It should be noted that the camera path and the gaze point path can be modified by moving positions P0 and Q0 with the mouse, or the like. Further, the height of the virtual camera path from the field 201 is set to have a default value (for example, 15 m) and the height of the gaze point path is set to have a default value (for example, 1 m), which is lower than the virtual camera path.

In step 703, processing is separated based on whether or not the heights of the virtual camera and the gaze point are to be adjusted. In a case in which the user presses a camera path height edit button 802 or a gaze point path height edit button 804, the processing advances to step 704.

In step 704, processing of adjusting the height of the virtual camera and the gaze point for the specified camera path (height adjustment processing) is performed. Here, an example of processing of adjusting the height of the virtual camera will be explained. The user moves the cursor to an arbitrary position (coordinates) on the camera path 811 and performs a click operation of the mouse, or the like, to specify the position (height editing point) of the virtual camera whose height the user desires to change. As in step 703, a divided point closest to the cursor is also selected and displayed as a height editing point. In FIG. 8B, a location indicated by an x mark on the camera path 811 indicates the height editing point specified by the user. It is possible to set a plurality of height editing points. In the example in FIG. 8B, two height editing points P1 and P2 are set. Simultaneously, points Q1 and Q2 on the gaze point path 812, which correspond to P1 and P2, respectively, are displayed. Further, distances connecting P1 and Q1 as well as P2 and Q2 are displayed on the GUI. This is because the size of an object within the virtual viewpoint video image changes depending on the distances between the virtual camera and the gaze point. The closer the distance is, the larger the object size becomes, thereby resulting in a blurred image. In the case of FIG. 8B, the distance between P1 and Q1 is 24 m and the distance between P2 and Q2 is 20 m, and thus, the distance between P2 and Q2 has more blurred image than the other. Once the height editing points are set, a height setting window 820 is displayed within the GUI screen 800. The user can input an arbitrary value (unit: m) to an input field 821 corresponding to each editing point within the height setting window 820 to change the height of the virtual camera at the position. In this case as well, the user can specify an arbitrary value while checking the telephoto camera group's image capturing area 601, the wide-angle camera group's image capturing area 602, and the distance between the virtual camera and the gaze point, and thus, the height of the virtual camera can be appropriately set. It should be noted that the heights other than that at the location at which the altitude is changed by the height editing point are adjusted so as not to change abruptly by interpolating the height from the height editing point at the position in the vicinity thereof or from the default value.

The processing described above is the content of the parameter setting processing for the virtual camera according to the present embodiment. It should be noted that each of the camera group's image capturing areas is displayed in two dimensions on the GUI screen of the present embodiment, but this may also be displayed in three dimensions.

As described above, according to the present embodiment, the user can set parameters, such as the movement path and the height of the virtual camera, while grasping the image capturing area of each camera group. Accordingly, the number of repeated tasks of setting parameters at the time of generating a virtual viewpoint video image can be reduced.

Second Embodiment

In the first embodiment, the common image capturing area by each camera group is visualized on the GUI screen for parameter setting of the virtual camera by projecting it onto the field map so as to appropriately set the camera path, and the like. Next, as the second embodiment, an explanation will be given as to an aspect in which a user can directly check the degree of resolution of an object in adjusting the height of the virtual camera.

Rough flows of a basic system structure and processing of generating virtual viewpoint video images are identical to those of the first embodiment, and thus, explanations thereof are omitted. An explanation will be given mainly on differences below.

Figure 9:
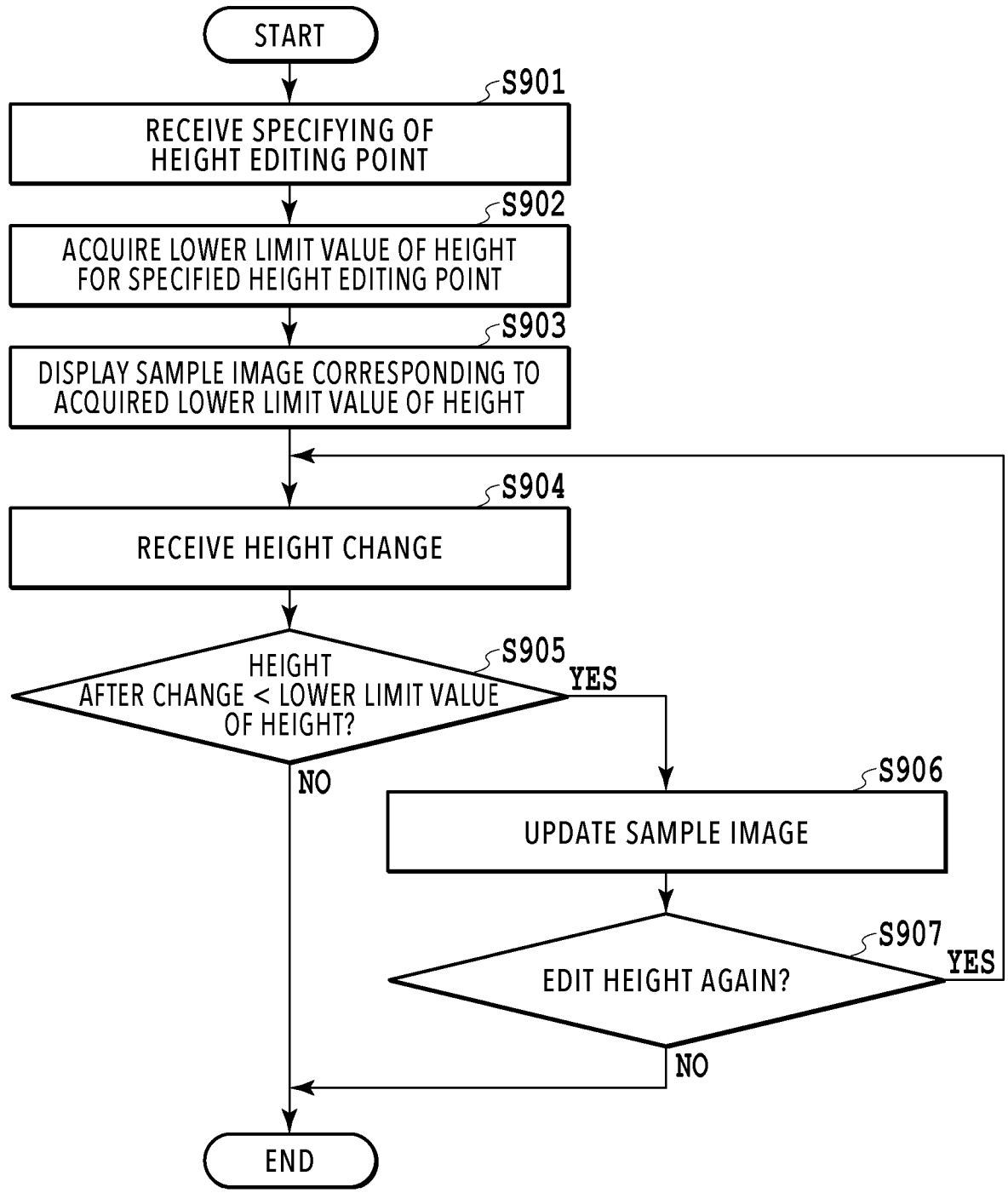
FIG. 9 is a flowchart showing the details of height adjustment processing for the virtual camera according to a second embodiment.

FIG. 9 is a flowchart showing the details of height adjustment processing for the virtual camera (the above-described step 704) according to the present embodiment.

In step 901, the specifying of a height editing point is received. The two points P1 and P2 are also specified here, as shown in FIG. 8B described above. In subsequent step 902, a lower limit value of a height for the specified height editing point is acquired. The lower limit value of the height refers to the height of the virtual camera corresponding to a lowest level allowed for the degree of resolution of an object, which is predetermined by the combination of the distance between the virtual camera and the gaze point, the angle of view of the virtual camera, and the camera group's image capturing area in which the gaze point is positioned. In other words, in a case in which the gaze point is positioned in the image capturing area of a high-resolution camera group, the distance between the virtual camera and the gaze point can be short and thus, the lower limit value of the height becomes low. In contrast, in a case in which the gaze point is positioned in the image capturing area of a low-resolution camera group, the lower limit value of the height becomes high. Meanwhile, in a case in which the angle of view is wide, the lower limit value of the height becomes low, and in a case in which the angle of view is narrow, the lower limit value of the height becomes high. Determination whether the degree of resolution is allowable or not depends, for example, on a criteria as to whether a level is below the degree of resolution of an object in a real camera. In acquiring the lower limit value of the height, coordinates of the gaze point of the specified height editing point are acquired first, and then classification information on each camera group's image capturing area corresponding to the coordinates and information on the distance between the virtual camera and gaze point and the angle of view of the virtual camera are acquired. The classification information refers to information, such as a flag, given to each coordinate position, indicating either the telephoto camera group's image capturing area 601 or the wide-angle camera group's image capturing area 602. Then, based on these acquired pieces of information, the lower limit value of the height of the virtual camera in the specified height editing point is acquired.

Figure 10A:
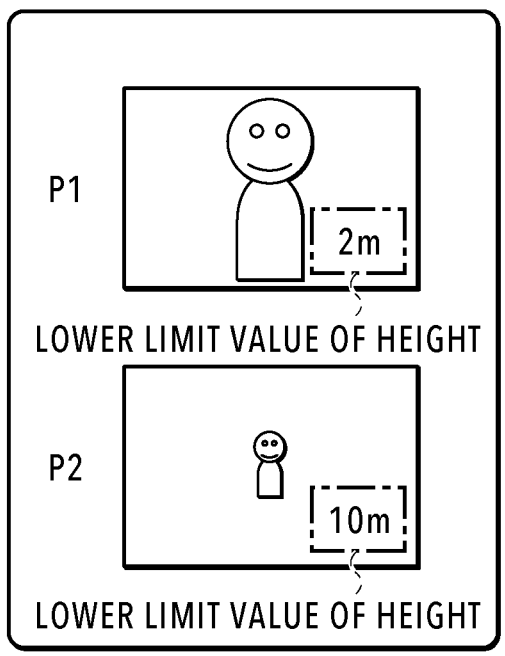
FIGS. 10A and 10B are diagrams each showing one example of a sample image of the virtual viewpoint video image.
Figure 11A:
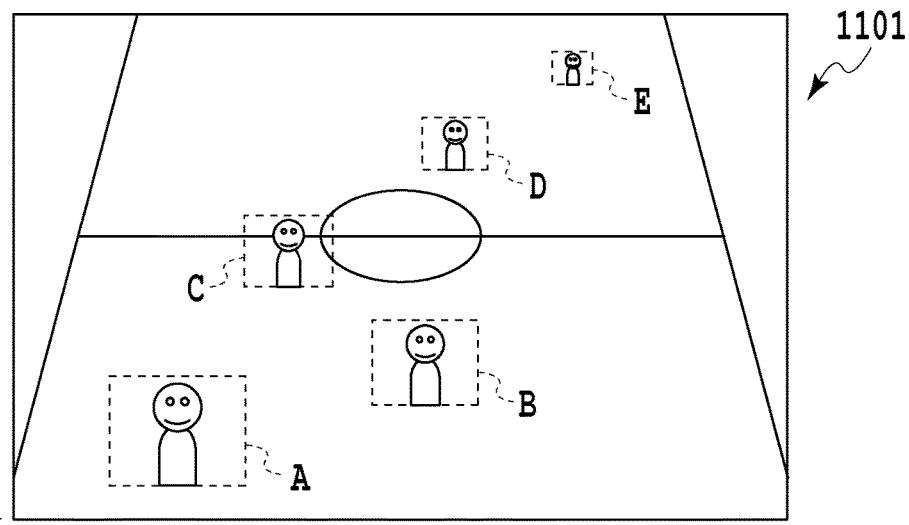
FIGS. 11A to 11C are diagrams each illustrating a method of generating a sample image.
Figure 11B:
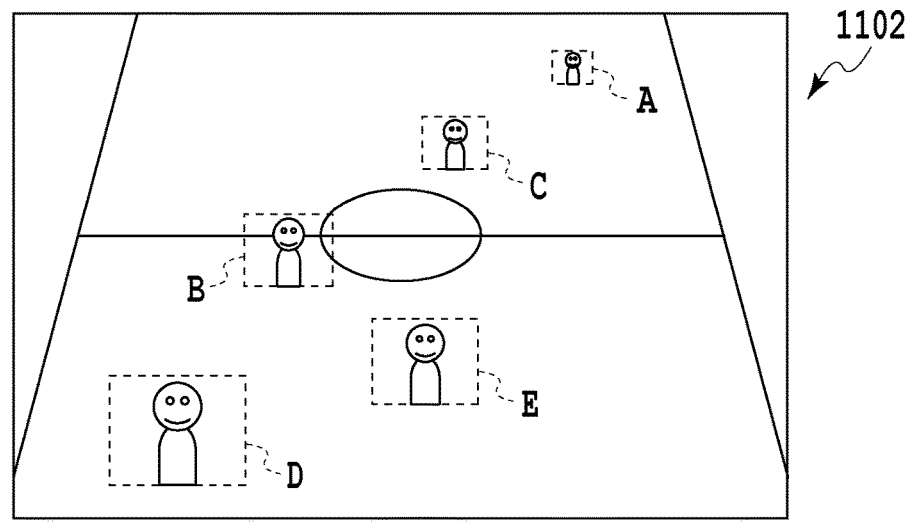
Figure 11C:
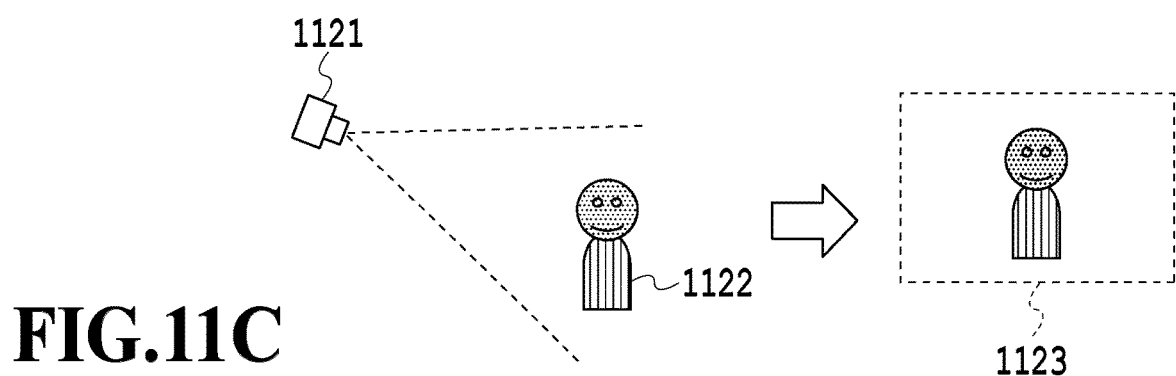

In step 903, a sample image of a virtual viewpoint video image corresponding to the acquired lower limit value of the height is displayed. A sample image is a cutout of objects from the video image captured by the real camera. A method of the cutout will be explained using FIGS. 11A and 11B. FIG. 11A shows an image 1101 captured by one real camera. The image 1101 shows objects A to E that correspond to five players. By identifying each player's face and uniform number using an existing recognition technique for this image 1101, a sample image of each object whose area has been cut out can be acquired. The acquired sample image data for each object is stored in the storage unit 103 together with information on the number of pixels (width and height) of the sample image. FIG. 11B shows an image 1102 captured by another real camera. The same processing is subjected to this image 1102 to acquire a sample image. Further, if the number of pixels for the newly generated sample image exceeds the number of pixels for the previously generated sample image, processing of overwriting (updating) with the newly generated sample image is repeated by each object. By performing this processing for all the real cameras, the sample image of a highest degree of resolution can be prepared by each object. In displaying a sample image, the sample image is reduced in accordance with the distance between the virtual camera and the object and the angle of view of the virtual camera. A method of this size reduction will be explained using FIG. 11C. First of all, an object closest to the gaze point is detected and the main memory 102 reads the sample image data of that object from the storage unit 103. Next, using the distance between the virtual camera and the object and the angle of view of the virtual camera, the number of pixels of an object area in the virtual viewpoint video image is calculated. To be more specific, a three-dimensional model 1122 of a player having a standard body size is disposed on the position of the detected object to depict a preview image 1123 viewed from a virtual camera 1121 for performing calculation. Then, the sample image is reduced such that the object area in the preview image 1123 and the number of pixels (width and height) of the sample image are identical or approximate. After such reduction, the image is enlarged to an appropriate size by simple interpolation to display it on the GUI screen 800. The sample image is displayed on the GUI screen 800 in a form of a subwindow, for example, as shown in FIG. 10A. Accordingly, the user can check the actual image of the degree of resolution of an object in the case of lowering a height to the lower limit value. At this time, as shown in FIG. 10A, the lower limit value of the height may be displayed together with the corresponding sample image.

In step 904, as to the specified height editing point, a change in the height input via the height setting window 820 is received. In subsequent step 905, it is determined whether a height after the change is below the lower limit value of the height. In a case in which the height after the change is below the lower limit, the processing advances to step 906. Meanwhile, in a case in which a height after the change is equal to or more than the lower limit, the processing ends.

Figure 10B:
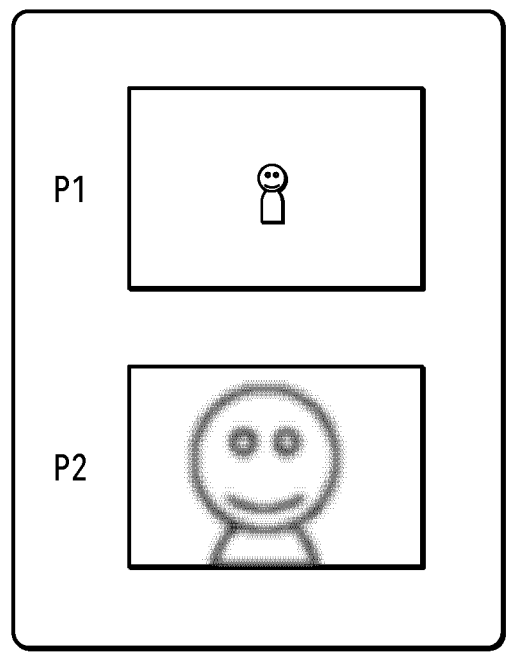

In step 906, the sample image is updated to a content corresponding to the height after the change, that is, to a sample image having a low resolution beyond an allowable limit. FIG. 10B shows an example of an updated sample image, in which it can be recognized that the sample image corresponding to the height adjusting point P2 is blurred. This updated sample image is, as similar to the above step 903, the resultant of a sample image intrinsic to the object that is reduced and enlarged for display in accordance with the distance between the virtual camera and the gaze point and the angle of view of the virtual camera after the setting. In this case, a message indicating that the specified height is below the lower limit value of the height by showing, for example, the wording "Height is below the lower limit value" may be displayed (warning display). In subsequent step 907, processing is switched depending on presence/absence of a further change of a height. In the case where another height is specified, the processing returns to step 904. In a case in which another height is not specified, the processing ends.

In the present embodiment, the video image capturing the actual game with the real camera has been used as a sample image, but a video image during practices or a portrait taken at a photo studio, for example, may be used, or an image rendering a person using computer graphics may be used. Alternatively, an object different from the actual object may be used as a sample image as long as the degree of resolution can be confirmed.

The processing described above is the content of processing of adjusting the height of the virtual camera according to the present embodiment. In the case of the present embodiment, at the time of editing a height of the virtual camera, a sample image corresponding to a lower limit value of a height in a specified height editing point is visually displayed, and thus, a user can readily determine an appropriate height.

Third Embodiment

In the first embodiment, the camera path, and the like, can be appropriately set by visualizing the common image capturing area by each camera group on the GUI screen for parameter setting of the virtual camera and by projecting it onto the field map. Next, an aspect of allowing the user to confirm an area in which the degree of resolution of an object rapidly varies will be explained as a third embodiment.

Rough flows of a basic system structure and processing of generating virtual viewpoint video images are identical to those of the first embodiment, and thus, explanations thereof are omitted. An explanation will be given mainly on differences below.

Figure 12:
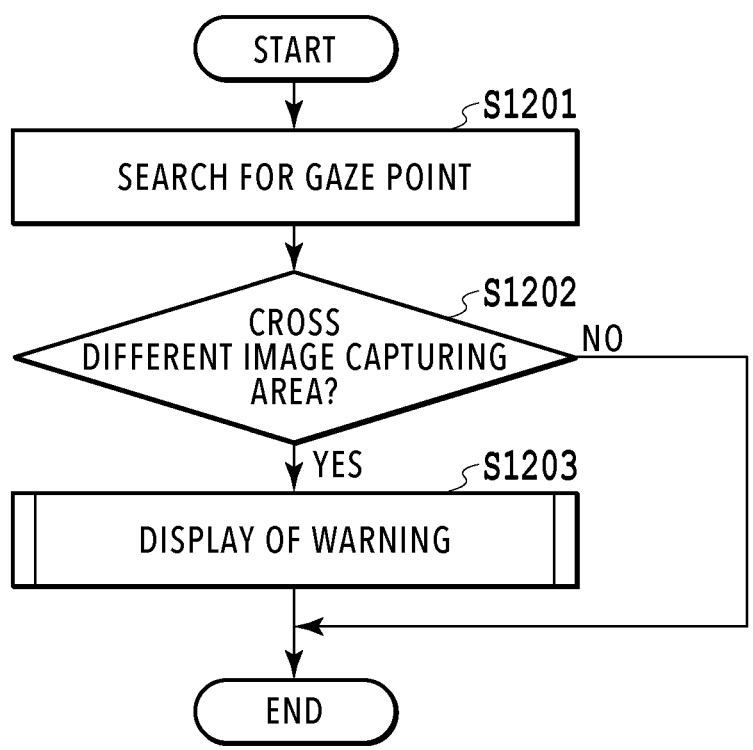
FIG. 12 is a flowchart showing the details of specifying processing of the virtual camera and a gaze point path according to a third embodiment.

FIG. 12 is a flowchart showing the details of setting processing (corresponding to the above-described step 702) of a gaze point path according to the present embodiment.

Figure 13:
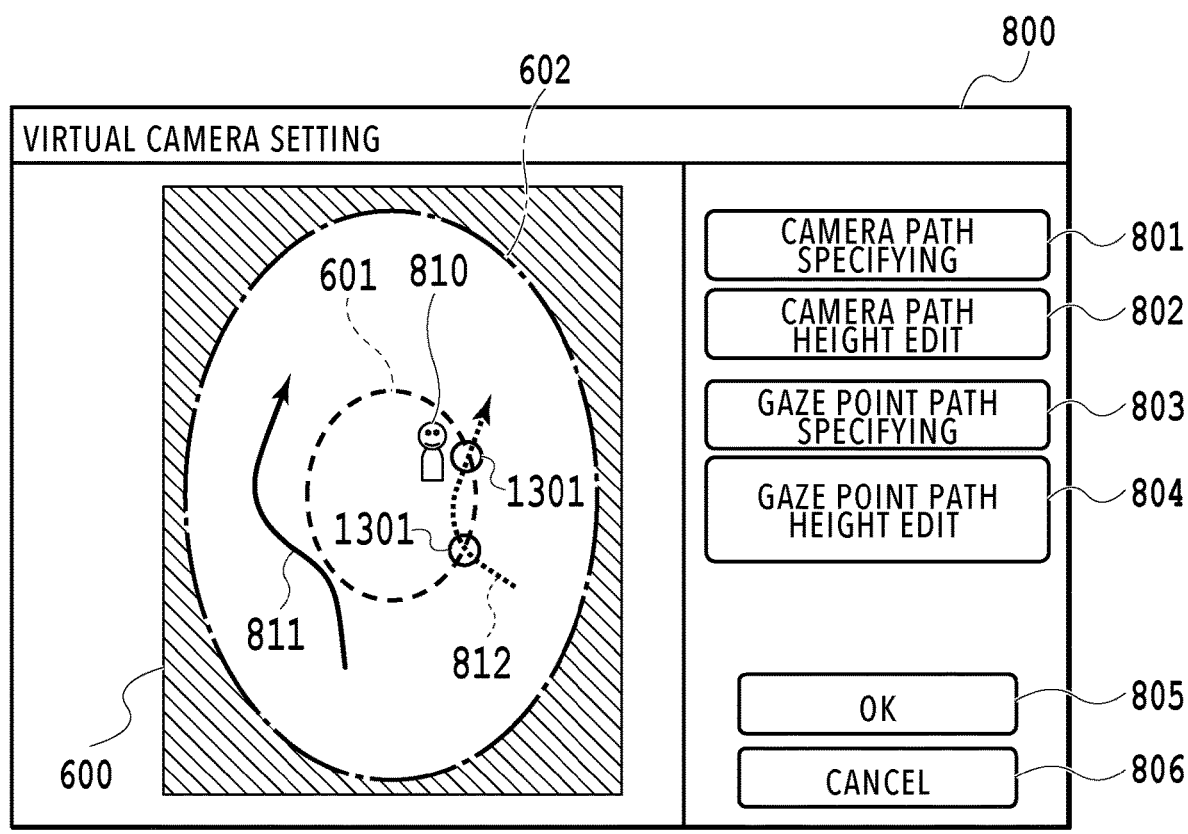
FIG. 13 is a diagram illustrating determination of a crossing.

In step 1201, after receiving the specifying of a gaze point, a path of the gaze point is to be searched for. This is processing to examine which camera group's image capturing area the coordinate value of the gaze point moves across. Next, in step 1202, it is determined whether a gaze point path found by the search crosses a plurality of camera group's image capturing areas. FIG. 13 is a diagram illustrating determination of this crossing. In the example of FIG. 13, a gaze point path 812 starting from the wide-angle camera group's image capturing area 602 passes through the telephoto camera group's image capturing area 601 and reenters the wide-angle camera group's image capturing area 602. Accordingly, this case is determined as a crossing. As such, in a case in which a result is determined to be the crossing of the path, the processing advances to step 1203. On the other hand, in a case in which a result is determined to be no crossing of the path, the processing ends. In step 1203, as shown in FIG. 13, a gap mark 1301 of the degree of resolution is displayed on a coordinate position in which a boundary between the image capturing areas and the gaze point path intersect each other. This mark is represented to warn the user that, since the specified gaze point moves by straddling the plurality of camera group's image capturing areas, a sense of resolution may possibly rapidly change in the vicinity of the gap mark 1301 in which a focal length of the camera changes. In this case, in the vicinity of the gap mark 1301, the user needs to take measures by, for example, moving the virtual camera away from the gaze point.

The processing described above is the content of warning processing for variation in the sense of resolution according to the present embodiment. In the case of the present embodiment, in editing the camera path and gaze point path, the variation in the sense of resolution of the virtual viewpoint video image can be visualized so that the user can readily determine the path setting of the virtual camera and gaze point path appropriately.

Incidentally, in the above first to third embodiments, the explanations have been given on the example of the image processing apparatus 100 performing all the processing including generation of a GUI for setting a virtual camera (virtual viewpoint), displaying of the GUI, reception of user's operation on the GUI, and generation of a virtual viewpoint video image. The present invention is not limited, however, to this example. For instance, an apparatus that performs the generation and displaying of the GUI and the reception of user's operation and an apparatus that performs the generation of the virtual viewpoint video image based on the user's operation may be separately provided. Further, the present invention can also be applied to a virtual viewpoint video image system including an apparatus (typically one apparatus) that performs generation of the GUI, a plurality of apparatuses that perform the displaying of the GUI and the reception of user's operation, and one or a plurality of apparatuses that perform the generation of the virtual viewpoint video image.

In addition, in the above-described first to third embodiments, the explanations have been mainly given on the example such that the common image capturing area, in which the image capturing areas of all cameras belonging to the telephoto camera group 109 overlap one another, and the common image capturing area, in which the image capturing areas of all cameras belonging to the wide-angle camera group 110 overlap one another, are displayed so as to discern them respectively. The present invention is not limited, however, to this example. For instance, among the twelve cameras belonging to the telephoto camera group 109, an area in which the image capturing areas of ten or more cameras overlap one another may be set as the common image capturing area.

OTHER EMBODIMENTS

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

According to the virtual viewpoint video image system of the present embodiment, the correspondence relationship between the position of a virtual viewpoint and the quality of a virtual viewpoint video image can be confirmed prior to the setting of the virtual viewpoint. Due to this, the repeated tasks of setting a path for the virtual camera can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A setting apparatus comprising:
(A) one or more hardware processors; and
(B) one or more memories that store instructions executable by the one or more hardware processors to cause the setting apparatus:
(a) to acquire information indicating respective configurations of a plurality of image capturing apparatuses at different positions, each of the plurality of image capturing apparatuses capturing an image of at least a part of a target space;
(b) to determine, based on the acquired information, a common image capturing area that is included within each of a plurality of fields of view, of the plurality of image capturing apparatuses;
(c) to cause a graphical user interface (GUI), which is used for setting a movement path of a virtual viewpoint for generating a virtual viewpoint image representing a view from the virtual viewpoint on the set movement path based on a plurality of images including the common image capturing area captured by the plurality of image capturing apparatuses, to display an image of the target space where (i) a designated movement path of the virtual viewpoint in the target space, (ii) a designated movement path of a gaze point positioned in a viewing direction from the virtual viewpoint in the target space, and (iii) the determined common image capturing area in the target space are shown such that a positional relationship between the designated movement path of the virtual viewpoint and the determined common image capturing area is indicated and a positional relationship between the designated movement path of the gaze point and the determined common image capturing area is indicated, wherein quality of the virtual viewpoint image depends on the positional relationship between a position of the virtual viewpoint and the common image capturing area; and (d) to set the movement path of the virtual viewpoint according to a user input obtained based on the GUI.

2. The setting apparatus according to claim 1, wherein the GUI displays an image representing, distinctively from the common image capturing area, an area not allowing generation of a virtual viewpoint image of a predetermined quality.

3. The setting apparatus according to claim 1, wherein, in the GUI, the common image capturing area is displayed onto a field map that corresponds to the target space including the common image capturing area.

4. The setting apparatus according to claim 1, wherein the acquired information includes at least information on an angle of view for each of the plurality of image capturing apparatuses.

5. The setting apparatus according to claim 1, wherein the instructions further cause the setting apparatus to store the information in a storage unit, wherein the information is acquired from the storage unit.

6. The setting apparatus according to claim 1, wherein:

the plurality of image capturing apparatuses are connected via a network; and the information is acquired by accessing the plurality of image capturing apparatuses via the network.

7. The setting apparatus according to claim 1, wherein the GUI further displays a sample image of a virtual viewpoint image that corresponds to a lower limit value of a height of a virtual viewpoint.

8. The setting apparatus according to claim 7, wherein, in a case in which a height below the lower limit value is specified in the GUI, a warning display indicating that the height is below the lower limit value is made.

9. The setting apparatus according to claim 8, wherein, along with the warning display, the sample image is updated to an image corresponding to the height below the lower limit value.

10. The setting apparatus according to claim 7, wherein the sample image is generated using a frame having an object area of a highest resolution in the plurality of captured images, and, at the time of displaying the sample image, the sample image is reduced in accordance with at least either one of a distance between a virtual viewpoint and an object and an angle of view of the virtual viewpoint.

11. The setting apparatus according to claim 10, wherein the sample image is generated for each object.

12. The setting apparatus according to claim 1, wherein, in a case in which a route of a gaze point crosses each of camera group's image capturing areas upon setting a gaze point path of a virtual viewpoint, a warning is displayed to notify variation in the sense of resolution.

13. The setting apparatus according to claim 1, wherein the GUI displays an image indicating a position of the virtual viewpoint, along with the common image capturing area.

14. The setting apparatus according to claim 1, wherein the GUI displays an image indicating a field of view of the virtual viewpoint, along with the common image capturing area.

15. The setting apparatus according to claim 1, wherein the GUI identifiably displays a boundary of the common image capturing area.

16. The setting apparatus according to claim 1, wherein, in the determining, a first common image capturing area that is included within each of fields of views of image capturing apparatuses belonging a first group, and a second common image capturing area that is included within each of fields of views of image capturing apparatuses belonging a second group, are determined, and the GUI displays distinctively the determined first common image capturing area and the determined second common image capturing area together.

17. The setting apparatus according to claim 16, wherein an angle of view of image capturing apparatuses belonging the first group is different from an angle of view of image capturing apparatuses belonging the second group.

18. The setting apparatus according to claim 1, wherein, in the determining, a first common image capturing area that is included within each of fields of views of a first predetermined number of image capturing apparatuses, and a second common image capturing area that is included within each of fields of views of a second predetermined number of image capturing apparatuses, are determined, and the GUI displays distinctively the determined first common image capturing area and the determined second common image capturing area together, wherein the second predetermined number is larger than the first predetermined number.

19. A setting method comprising the steps of:

acquiring information indicating respective configurations of a plurality of image capturing apparatuses at different positions, each of the plurality of image capturing apparatuses capturing an image of at least a part of a target space;

determining, based on the acquired information, a common image capturing area that is included within each of a plurality of fields of view, of the plurality of image capturing apparatuses;

causing a graphical user interface (GUI), which is used for setting a movement path of a virtual viewpoint for generating a virtual viewpoint image representing a view from the virtual viewpoint on the set movement path based on a plurality of images including the common image capturing area captured by the plurality of image capturing apparatuses, to display an image of the target space where (i) a designated movement path of the virtual viewpoint in the target space, (ii) a designated movement path of a gaze point positioned in a viewing direction from the virtual viewpoint in the target space, and (iii) the determined common image capturing area in the target space are shown such that a positional relationship between the designated movement path of the virtual viewpoint and the determined common image capturing area is indicated and a positional relationship between the designated movement path of the gaze point and the determined common image capturing area is indicated, wherein quality of the virtual viewpoint image depends on the positional relationship between a position of the virtual viewpoint and the common image capturing area; and setting the movement of the virtual viewpoint according to a user input obtained based on the GUI.

20. A non-transitory computer-readable storage medium storing a program for causing a computer to perform a setting method, the setting method comprising the steps of:

acquiring information indicating respective configurations of a plurality of image capturing apparatuses at different positions, each of the plurality of image capturing apparatuses capturing an image of at least a part of a target space;

determining, based on the acquired information, a common image capturing area that is included within each of a plurality of fields of view, of the plurality of image capturing apparatuses;

causing a graphical user interface (GUI), which is used for setting a movement path of a virtual viewpoint for generating a virtual viewpoint image representing a view from the virtual viewpoint on the set movement path based on a plurality of images including the common image capturing area captured by the plurality of image capturing apparatuses, to display an image of the target space where (i) a designated movement path of the virtual viewpoint in the target space, (ii) a designated movement path of a gaze point positioned in a viewing direction from the virtual viewpoint in the target space, and (iii) the determined common image capturing area in the target space are shown such that a positional relationship between the designated movement path of the virtual viewpoint and the determined common image capturing area is indicated and a positional relationship between the designated movement path of the gaze point and the determined common image capturing area is indicated, wherein quality of the virtual viewpoint image depends on the positional relationship between a position of the virtual viewpoint and the common image capturing area; and setting the movement of the virtual viewpoint according to a user input obtained based on the GUI.

* * * * *